United States Patent Office 3,546,299
Patented Dec. 8, 1970

3,546,299
CHLOROMETHYL BISPHENOL A ETHERS
Duane B. Priddy, Lansing, and Henry E. Hennis, Midland, Mich., assignors to The Dow Chemical Company, Midland, Mich., a corporation of Delaware
No Drawing. Filed Nov. 29, 1968, Ser. No. 780,212
Int. Cl. C07c 43/20
U.S. Cl. 260—613
6 Claims

ABSTRACT OF THE DISCLOSURE

Compounds corresponding to the formula

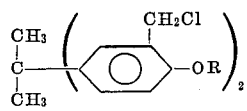

wherein R represents a lower alkyl, lower alkenyl or benzyl group. They are prepared by chloromethylating the lower alkyl, lower alkenyl or benzyl ethers of bisphenol A. The compounds are useful as microbicides.

SUMMARY OF THE INVENTION

The present invention concerns a group of new chloromethyl bisphenol A ethers corresponding to the formula

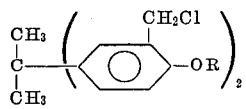

wherein R represents a lower alkyl, lower alkenyl or benzyl group. In the specification and claims, the term "lower alkyl" refers to straight and branched chain alkyl groups containing from 1, to 2, to 3, to 4 carbon atoms, for example, methyl, ethyl, propyl, iso-propyl, n-butyl and t-butyl, while the term "lower alkenyl" refers to alkenyl groups containing from 2, to 3, to 4 carbon atoms, such as ethenyl, propenyl and butenyl. The new compounds are crystalline solids or oils which have a low solubility in water and in water-soluble alcohols and a higher solubility in common organic solvents such as acetone, benzene, toluene and xylene. The compounds are microbicides and are particularly adapted to be used for the control of various fungal and bacterial organisms.

The compounds are prepared by chloromethylating a 2,2-bis(4-alkoxy-, alkenyloxy- or benzyloxyphenyl)-propane, i.e., a diether of para, para′-isopropylidene-diphenol, the phenol itself commonly being referred to in the art as bisphenol A, according to the following equation:

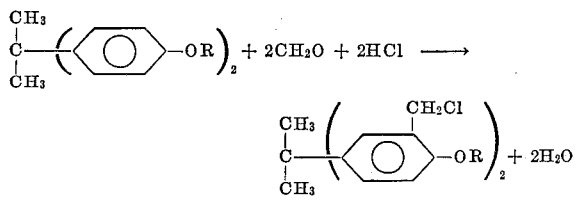

The reaction is conveniently carried out in the presence of acetic acid as a solvent reaction medium. The acetic acid also functions as a catalyst. Hydrogen chloride reactant is used, preferably as anhydrous gas, advantageously by saturating the acetic acid reaction medium therewith. The formaldehyde reactant also is advantageously dissolved in the reaction medium, conveniently as a low polymer such as trioxane or para-formaldehyde. The amounts of the reactants to be employed are not critical, some of the product being formed when employing any proportions. The reaction consumes the reactants in the ratio of 1 mole of the bisphenol A ether to 2 moles of each of the formaldehyde and hydrogen chloride chloromethylating reactants, and the employment of such proportions is advantageous. However, superior yields are obtained when using from 200 to 500 percent or more of theoretical proportions of formaldehyde and hydrogen chloride. The upper limits of the amounts of excess formaldehyde and hydrogen chloride used are ordinarily determined by the economics of the process. The reaction proceeds at a temperature at which water of reaction is liberated, conveniently at temperatures between 0° C. and reflux temperature. Pressure equipment can be used when it is desired to use temperatures higher than the normal atmospheric reflux temperature.

In carrying out the reaction, the bisphenol A ether and the chloromethylating reagents are contacted in any convenient fashion and maintained for a predetermined period of time in the reaction temperature range to complete the reaction. In a convenient procedure, the bisphenol A ether is added to a well-stirred solution of formaldehyde polymer and anhydrous hydrogen chloride in acetic acid, the solvent medium conveniently first having been saturated with anhydrous hydrogen chloride. During the addition of the bisphenol A ether to the chloromethylating reaction medium and for a period thereafter, the temperature of the reaction mixture is maintained within the reaction temperature range.

Upon completion of the reaction, the desired product is separated by conventional procedures. In a convenient operation, the reaction mixture is poured into water and the oily crude product which separates is washed with aqueous base, for example, aqueous 10 percent sodium hydroxide, potassium hydroxide, sodium carbonate or potassium carbonate. The so-washed oily product may usually be crystallized from a suitable solvent, e.g., aqueous ethanol, isopropanol or n-butanol and dried to give purified product.

DESCRIPTION OF THE PREFERRED EMBODIMENTS

The following examples describe completely representative specific embodiments and the best modes contemplated by the inventors for carrying out their invention.

EXAMPLE 1

2,2-bis(α-chloro-4-methoxy-m-tolyl)propane 2,2 - bis(4 - methoxyphenyl)propane (128 grams; 0.5 mole) is added to a well-stirred solution of 60 grams trioxane (2 molar equivalents of formaldehyde) and 500 milliliters of acetic acid which had previously been saturated with anhydrous hydrogen chloride. The reaction temperature is maintained at from about plus 5° to plus 10° C. with stirring for about 1 hour. The reaction mixture is then warmed to 60° C. over a 2-hour period and then poured into 500 milliliters of water. The white oily product which separates is washed with aqueous 10 percent sodium hydroxide and crystallized from isopropanol to yield a white crystalline solid melting at 97°–99° C. The product is found upon analysis to be consistent with the assigned structure. Its molecular weight is 353.4.

Other representative compounds of the present invention are prepared in accordance with the procedure described above, using other alkyl, alkenyl and benzyl bisphenol A ethers as starting materials. The resulting compounds have a structure corresponding to the formula presented in Table I. In Table I the symbol "M.W." is used as an abbreviation of the term "molecular weight."

TABLE I

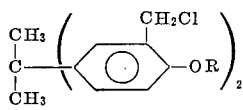

| Identity of R: | Characterizing property |
|---|---|
| Ethyl | Melting at 74°–75° C., M.W. 381.4. |
| n-Propyl | M.W. 409.4. |
| Allyl | M.W. 405.3; oily liquid, $N_{20}{}^D$ 1.5595. |
| 2-Butenyl | M.W. 433.4. |
| n-Butyl | M.W. 437.4. |
| Benzyl | Melting at 148°–149.5° C., M.W. 505.5. |

The new compounds are useful as pesticides and antimicrobials for the control of bacteria and fungi such as *Bacillus substilis, Trichophyton mentagrophytes, Venturia inaequalis* (applescab fungus) and *Rhizopus nigricans* (bread mold fungus). For such use, the unmodified compounds can be employed. Alternatively, the toxicant compounds can be dispersed on an inert finely-divided solid to prepare dust compositions. The dust compositions can be dispersed in water with or without the aid of a wetting or dispersing agent, the resulting aqueous dispersions being useful as sprays. In other procedures, the compounds can be employed as constituents in oil or solvent compositions, or with or without emulsifying or dispersing agent in solvent-in-water or water-in-solvent emulsions or dispersions which are useful as sprays, drenches or washes.

The exact concentration of the toxic contituent to be employed in the treating composition is not critical and may be varied considerably provided an effective amount of the toxicant is supplied, whether on the plant or plant part or in the soil, ink, adhesive, cutting oil, textile, paper, wood or other environment of the organism. Good results are obtained when employing compositions containing pesticidal or antimicrobial concentrations and usually from about 2,500 to 10,000 parts per million by weight of one or more of the compounds. This is not to suggest that the compounds herein claimed and compositions containing them are equally effective at similar concentrations or against the same pests, whether fungal or bacterial. The concentration of toxicant in liquid compositions generally is from about 1–50 percent by weight. Concentrations up to 95 weight percent often are conveniently employed. Thus, the concentration of the toxicant can be from about 1–10 weight percent. In compositions to be employed as concentrates, the toxicant can be present in a concentration of from 5–98 weight percent.

In representative operations, each of 2,2-bis(α-chloro-4-methoxy-m-tolyl)propane, 2,2-bis(α-chloro-4-ethoxy-m-tolyl)propane and 2,2-bis(4-(allyloxy)-α-chloro-m-tolyl)propane is employed in aqueous acetone compositions at a concentration of 2,500 parts per million by weight. The first named composition gives complete control of *Bacillus subtilis* while the second and third named compositions give complete control of *Trichophyton mentagrophytes*.

In further operations, 2,2-bis(4-(benzyloxy)-α-chloro-m-tolyl)propane gives 90 percent control of *Venturia inaequalis* and *Rhisopus nigricans* when employed in oil-in-water emulsions at a concentration of 2,500 parts per million.

What is claimed is:

1. The compound corresponding to the formula

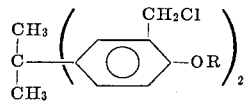

wherein R represents a 1 to 4 carbon lower alkyl, a 2 to 4 carbon lower alkenyl or a benzyl group.

2. The compound as claimed in claim 1 wherein R is methyl, ethyl, allyl or benzy.

3. The compound as claimed in claim 1 wherein R is methyl.

4. The compound as claimed in claim 1 wherein R is ethyl.

5. The compound as claimed in claim 1 wherein R is allyl.

6. The compound as claimed in claim 1 wherein R is benzyl.

References Cited

UNITED STATES PATENTS

| 2,302,363 | 11/1942 | Bellefontaine | 260—613 |
| 2,326,702 | 8/1943 | Taylor et al. | 260—613 |
| 2,504,382 | 4/1950 | Bovsgvet et al. | 260—613 |
| 2,560,350 | 7/1951 | Jelinek | 260—613 |
| 2,745,726 | 5/1956 | Young et al. | 260—613 |

BERNARD HELFIN, Primary Examiner

U.S. Cl. X.R.

260—999; 424—341